United States Patent
Thomassin et al.

(10) Patent No.: US 7,014,557 B2
(45) Date of Patent: Mar. 21, 2006

(54) OUTLET DEVICE FOR THE INTERIOR OF A VEHICLE

(75) Inventors: Stefan Thomassin, Lippstadt (DE); Stefan Harasta, Paderborn (DE); Elmar Schrewe, Anröchte (DE)

(73) Assignee: Goodrich Hella Aerospace Lighting Systems GmbH, Lippstadt (DE)

(*) Notice: Subject to any disclaimer, the term of this patent is extended or adjusted under 35 U.S.C. 154(b) by 0 days.

(21) Appl. No.: 10/896,116

(22) Filed: Jul. 22, 2004

(65) Prior Publication Data

US 2005/0064809 A1   Mar. 24, 2005

Related U.S. Application Data

(60) Provisional application No. 60/500,685, filed on Sep. 8, 2003.

(30) Foreign Application Priority Data

Jul. 23, 2003   (EP) .................................. 03016788

(51) Int. Cl.
*F24F 13/08*   (2006.01)
(52) U.S. Cl. .................... 454/76; 454/154; 454/324
(58) Field of Classification Search ................ 454/76, 454/108, 109, 154, 286, 324, 334; 137/625.38, 137/625.33, 625.32
See application file for complete search history.

(56) References Cited

U.S. PATENT DOCUMENTS

| | | | | |
|---|---|---|---|---|
| 117,853 A | * | 8/1871 | Allen | ......................... 251/352 |
| 2,462,989 A | * | 3/1949 | Mufich et al. | .............. 454/286 |
| 3,391,870 A | * | 7/1968 | Nash | ....................... 239/417.3 |
| 5,328,152 A | * | 7/1994 | Castle | .......................... 251/229 |
| 5,399,119 A | | 3/1995 | Birk et al. | |

FOREIGN PATENT DOCUMENTS

DE   1218 892   6/1966

* cited by examiner

*Primary Examiner*—Harold Joyce
(74) *Attorney, Agent, or Firm*—Birch, Stewart, Kolasch & Birch, LLP

(57) ABSTRACT

The air outlet device (10) for the interior of a vehicle, particularly for being arranged above a seat of a vehicle such as, e.g., an airplane, a bus or the like, is provided with an air outlet element (38) comprising at least one air inlet opening (44) and an air outlet opening (45). Further, the air outlet device (10) comprises a slide element (46) for blocking and unblocking the at least one air inlet opening (44) and an actuating element (30) for moving the slide element (46), which is arranged at the air outlet opening (45) and comprises a collar. The actuating element (30) is supported so as to be pivotable about a longitudinal axis (50) of the collar. When the actuating element (30) is rotated, the slide element (46) is movable along a curved path for blocking and unblocking.

18 Claims, 3 Drawing Sheets

OUTLET DEVICE FOR THE INTERIOR OF A VEHICLE

Figure 1:
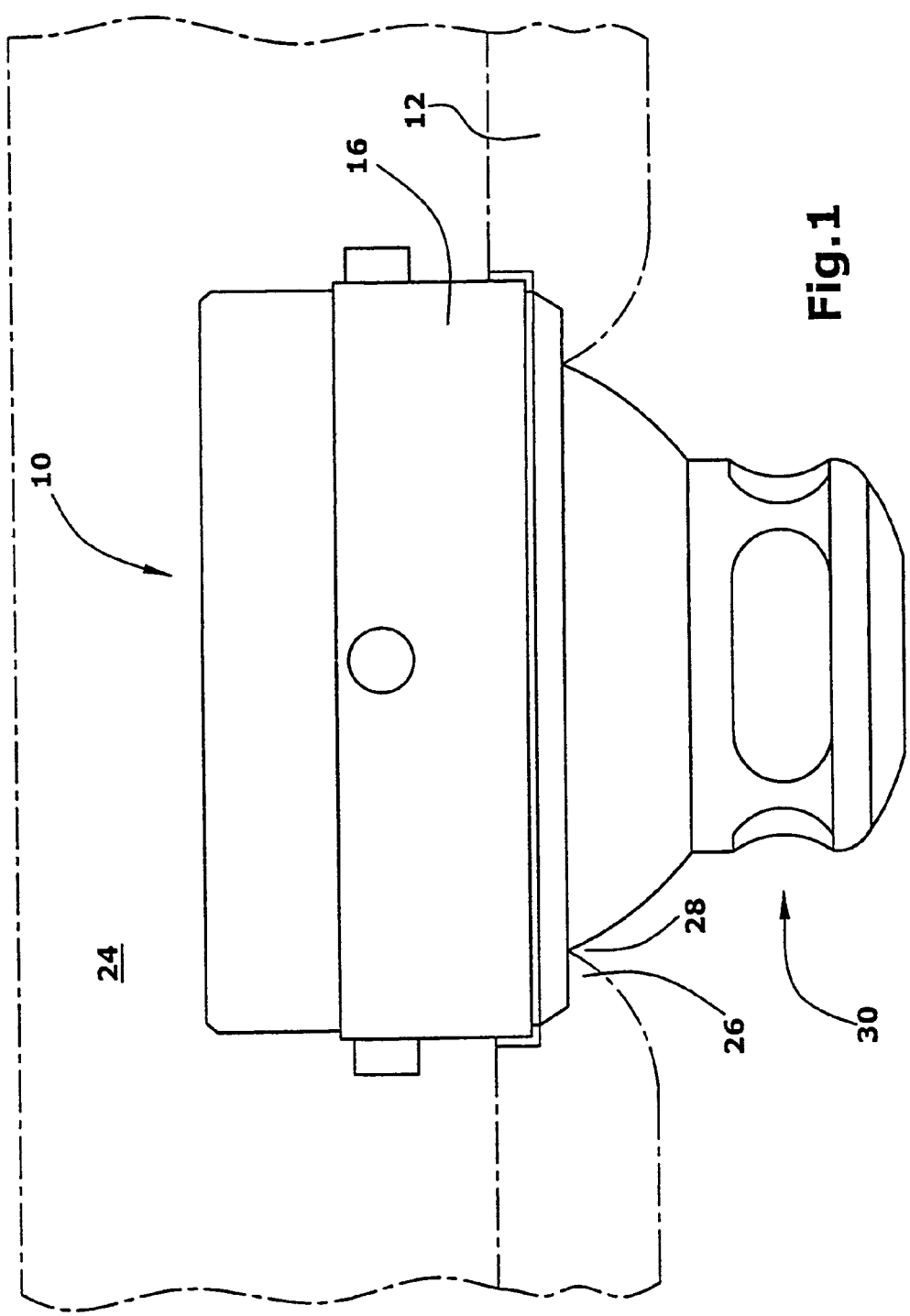

This Nonprovisional application claims priority under 35 U.S.C. § 119(e) on U.S. Provisional Application No. 60/500, 685 filed on Sep. 8, 2003 and under 35 U.S.C. § 119(a) on Patent Application No(s). 03 016 788.6 filed in Europe on Jul. 23, 2003, the entire contents of which are hereby incorporated by reference.

The invention relates to an air outlet device for the interior of a vehicle and particularly for being arranged above a seat of a vehicle which is, for example, an airplane, a bus or another means of mass transportation.

In vehicle interiors, diverse air outlet devices are known for the supply of air. Above seats in airplanes or busses, for example, there are adjustable air outlet nozzles pivotably supported in a ball-shaped retaining element. Such an air outlet device, for example, is described in U.S. Pat. No. 5,399,119. In this known air outlet, a closing element is axially displaced when an actuating element is rotated so that an annular air outlet opening is changeable in its cross section.

Another known air outlet device comprises an air outlet duct in which a pivotable flap is rotatably supported in the way of a throttle. By rotation of a collar-shaped actuating element arranged at the air outlet opening and via which the flap can be pivoted, the intensity of the airflow can be influenced. When the flap is inclined, an undesired airflow deflection is produced.

Both afore-mentioned structures have in common that the air outlet duct is considerably limited in its total cross section by the built-in closing elements even if the air outlet device is completely opened. In order to supply a required minimum air quantity in the completely opened condition, it is therefore required to enlarge the actual air outlet duct or the actual air outlet opening. In part, this is aesthetically less appealing and requires more installation room both of which is not desired.

From DE-B-1 218 892, another design of an air outlet device is known which comprises an axially displaceable air outlet fitting. This air outlet fitting cooperates with radial air inlet openings and operates in the way of a slide blocking or unblocking different air inlet openings by moving axially whereby air can be let out either through the outlet fitting only or outside of the outlet fitting or both through the outlet fitting and outside of the outlet fitting.

It is an object of the invention to provide an air outlet device that is able to output a sufficient quantity of air although the air outlet opening cross section is as small as possible. Further, the structure of this air outlet device shall have a simple construction. Finally, the design has to be chosen such that the generation of disturbing flow noise is prevented.

In order to solve this object, the invention suggests an air outlet device for the interior of a vehicle, particularly for being arranged above a seat of a vehicle such as, e.g., an airplane, a bus or the like, the air outlet device being provided with an air outlet element comprising at least one air inlet opening and one air outlet opening, a slide element for blocking and unblocking the at least one air inlet opening, and an actuating element for moving the slide element, which is arranged at the air outlet opening and comprises a collar, wherein the actuating element is supported so as to be rotatable about a longitudinal axis of the collar, and the slide element is movable along a curved path for blocking and unblocking when the actuating element is rotated.

The air outlet device according to the invention comprises an air outlet element comprising at least one air inlet opening for the supply of air and an air outlet opening for the discharge of the supplied air. In this air outlet element, a rotatable slide element is located which is supported so as to be rotatable about the longitudinal axis of the air outlet element and serves to block and unblock the at least one air inlet opening, respectively. At the air outlet opening of the air outlet element, an actuating element is arranged which is configured in the way of a collar and is particularly provided with recessed grips or the like features making the handling easier. By rotating the collar-shaped actuating element, the slide element can be turned. In doing so, the slide element moves along a curved path.

Apart from the at least one air inlet opening and the air outlet opening, the air outlet element does not comprise any openings serving the entrance of air to be supplied to the interior. Preferably, the air outlet element is a rotationally symmetric body preferably comprising a cylindrical or a conical shell wall. The at least one air inlet opening is arranged in the shell wall. Preferably, the shell wall or the air outlet element comprises two diametrically opposed air inlet openings. In a first rotational position of the actuating element, a slide portion of the slide element blocks the at least one air inlet opening, whereas the slide element substantially unblocks this air inlet opening completely in a second rotational position. The slide portion of the slide element and the wall of the air outlet element to at least one side of the air inlet opening are arranged so as to be parallel to each other. This wall portion of the air outlet element and the slide portion, respectively, are configured as parts of rotationally symmetric walls (e.g., cylindrical wall or conical wall).

A preferred embodiment of the invention is to be seen in the configuration of the air outlet element as a conical element with at least one air inlet opening extending over the height of the conical wall. The advantage of this arrangement consists in that now, air of an airflow axially impinging onto the tapered end of the truncated air outlet element, substantially without any deflection of the airflow, reaches from the outside of the air outlet element to the interior thereof through which it is discharged again via the air outlet opening. This results in extremely good flow conditions suppressing ambient noise. With two air inlet openings being arranged, favorable opening cross sections can be realized. It is possible, for example, that the total area of all the air inlet openings configured in this way amounts to more than 12 times the cross-sectional area of the air inlet opening. Thus, only the dimensioning of the air outlet opening is decisive for the maximally possible air throughput. Hence, structural elements impairing this maximally possible air throughput are no longer present in the inventive air outlet device in the air supply duct in the region of the air outlet element. The blocking element, namely the slide element, is covered by a part of the air outlet element when the air inlet opening is completely opened, i.e., it does not impair the airflow.

Apart from the fluidically favorable properties (no flow deflection and no baffle elements because of the slide element in the opened condition of the air inlet opening or air inlet openings), the substantially two-piece structure of the air outlet device is extremely simple and clear and thus easy to mount and to maintain and reliable as to its function.

The air outlet device according to the invention can either be arranged rigidly or pivotably (via a ball-headed link).

Figure 2:
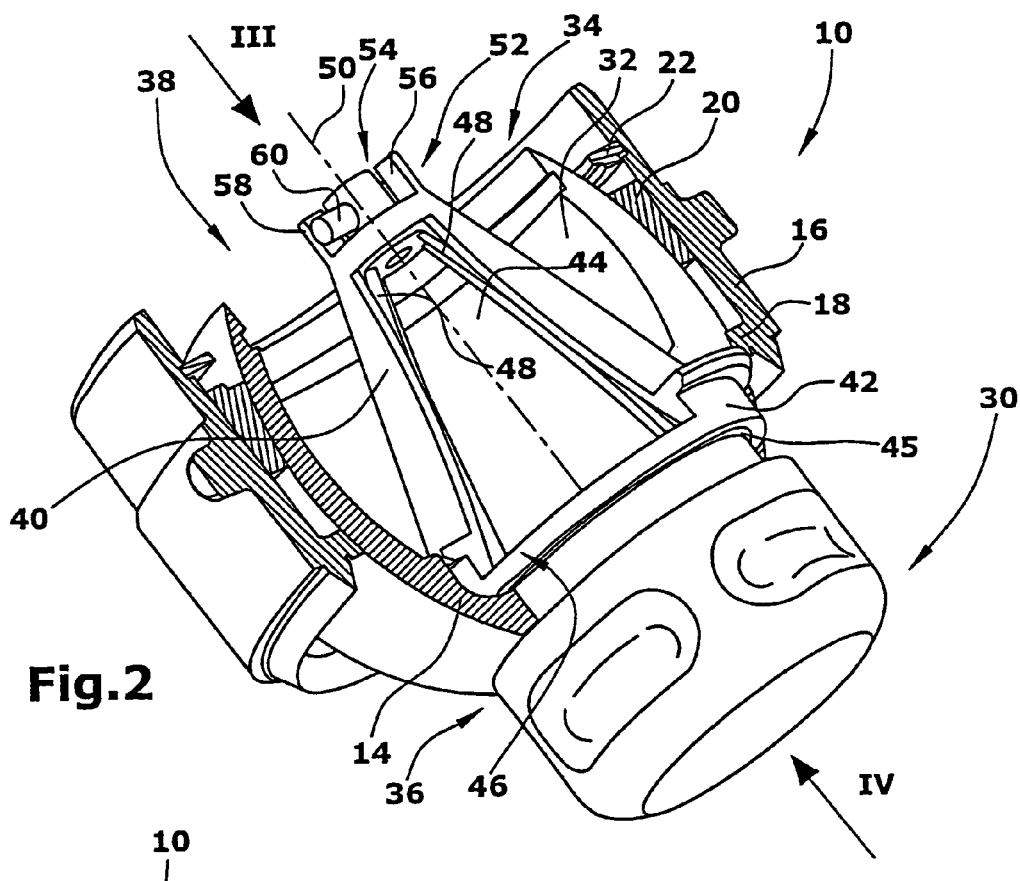
Figure 3:
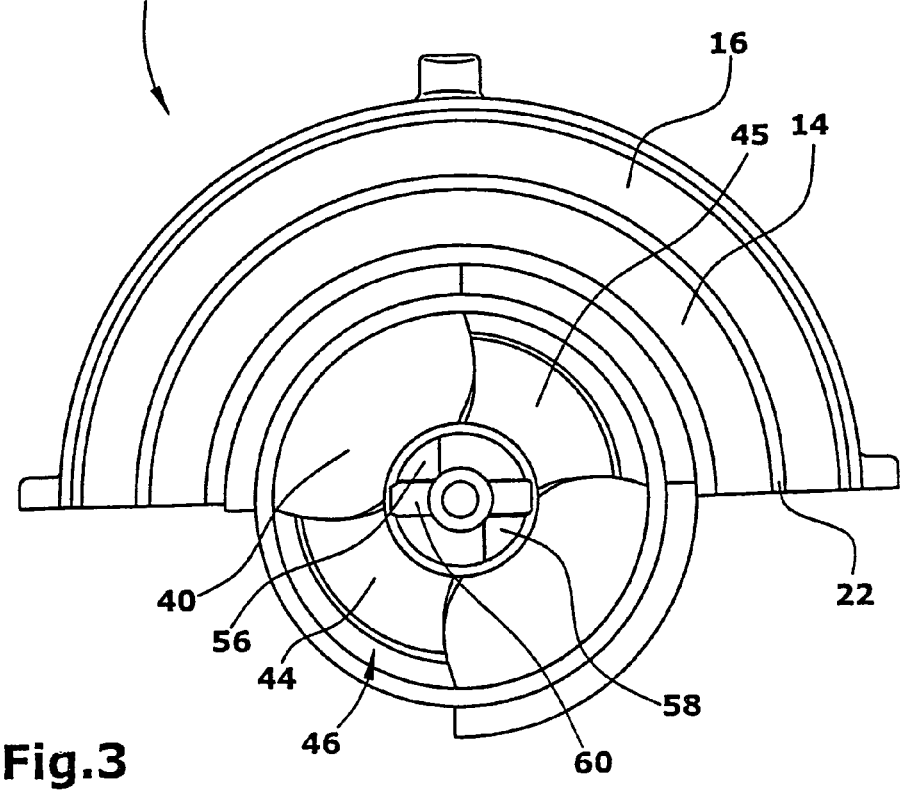
Figure 4:
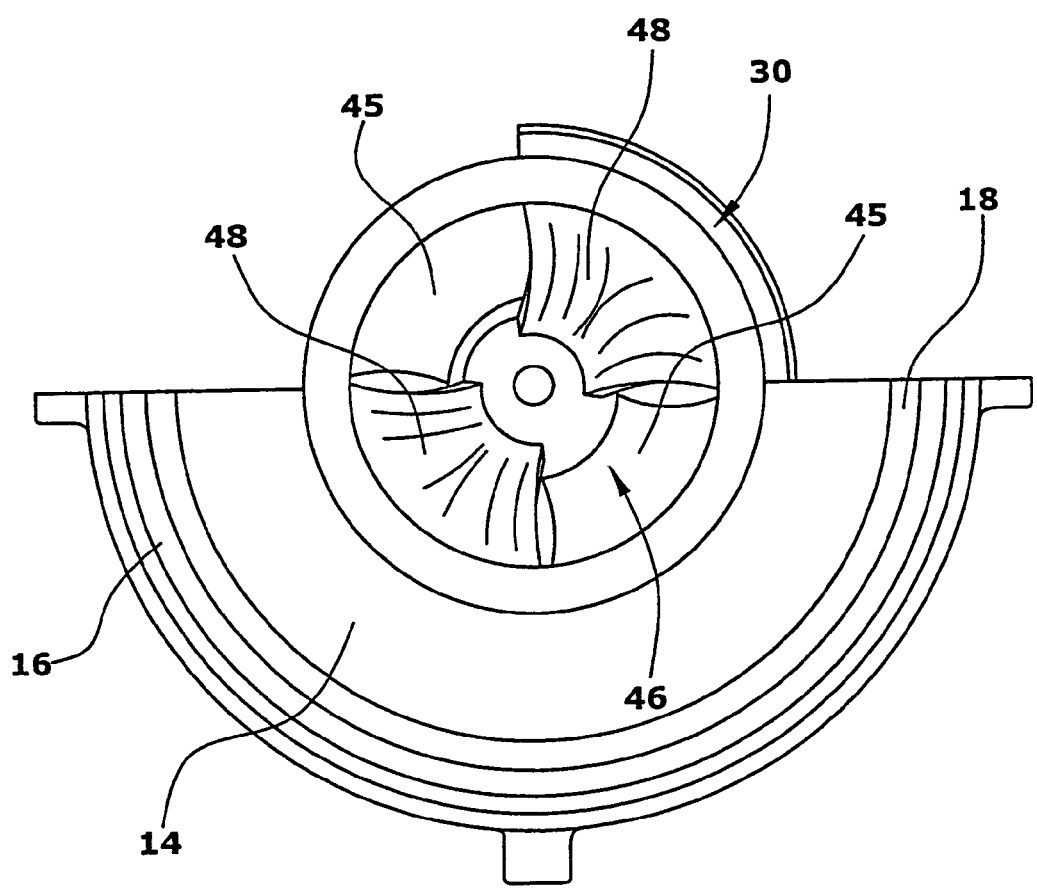

Hereinafter, the invention is explained in detail with reference to the drawing with respect to an embodiment. In the Figures:

FIG. 1 shows a side view of the air outlet device for aerating a seat in a vehicle such as, e.g., an airplane or a bus, with a hint of a ceiling panel, FIG. 2 shows a perspective and partially broken-up representation of the air outlet device to clarify its insides, FIG. 3 shows a view of the air outlet device in airflow direction, and FIG. 4 shows a view of the air outlet device opposite to the flow direction.

In FIGS. 1 to 4, the structure of an air outlet device 10 as well as the cooperation of the individual components of this air outlet device 10 is illustrated. According to FIG. 1, the air outlet device 10 is arranged in the ceiling panelling 12 above a passenger's seat in an airplane or bus, for example. By manually actuating the air outlet device 10, the intensity and direction of an airflow can be changed.

The air outlet device 10 comprises a ball-shaped retaining element 14 being pivotably supported in a cylindrical receiving element 16 within a solid angle range being structurally conditioned with respect to its size. This receiving element 16 is constituted in the way of a sleeve and comprises an inner flange 18 (see FIG. 2) at its end supported on the ceiling paneling 12, said inner flange abutting on the spherical outside of the ball-shaped retaining element 14. At the inside of the receiving element 16, a bearing element (see FIG. 2) is arranged thereat, its outside abutting on the receiving element 16 being cylindrical and its side abutting on the retaining element 14 having a spherically concave configuration. This bearing element 20 does not only serve to bear the ball-shaped retaining element 14 but also to seal the gap between the receiving element 16 and the retaining element 14 air-tight. In its built-in position, the bearing element 20 is biased, according to FIG. 2, by a (non-illustrated) corrugated spring washer that is supported on the bearing element 20, on the one hand, and on a circlip ring 22 secured at the receiving element 16, on the other hand.

As shown in FIG. 1, the bearing element 20 is located in a chamber or a channel 24 supplied with pressurized air and at its end provided with the inner flange 18, it sealingly abuts on the edge 26 of an opening 28 of the ceiling paneling 12. Thus, a part of the ball-shaped retaining element 14 as well as an actuating element 30 for setting the intensity and direction of the airflow project from the opening 28.

According to FIG. 2, the retaining element 14 comprises a cylindrical passage 32 the one end 34 of which projects into the channel 24 and at the other end 36 of which the actuating element 30 is arranged. In the interior of the passage 32, there is an air outlet element 38 comprising substantially a conical wall 40 with a cylindrical collar 42. The cylindrical collar 42 is located at the end 36 of the retaining element 14 at which the actuating element 30 is located as well. Thus, the air outlet element 38 projects into the passage 32 conically and opposite to the flow direction.

The conical wall 40 of the air outlet element 38 is provided with two trapezoidal air inlet openings 44 arranged diametrically opposite each other. Substantially, the surface area of each air inlet opening 44 amounts to at least a quarter of the entire conical wall 40. The base of the conical shape of the air outlet element 38 forms an air outlet opening 45.

In the interior of the air outlet element 38, a slide element 46 is arranged which comprises two slide portions 48 which, when the slide element 46 also being substantially conical is rotated, can be brought in superposition with the air inlet openings 44. Preferably, the slide element 46 is integrally formed with the collar-shaped actuating element 30, i.e., it can be turned about the longitudinal axis 50 of the air outlet element 38 in the latter.

By the conical or truncated configuration of both the air outlet element 38 and the slide element 46, it is reliably achieved that the slide portions 48 seal the air inlet openings 44 tight in a reliable manner, taking process tolerances to be provided into consideration. Due to the fact that the two conical elements are axially brought together, the slide portions 48 always abut two-dimensionally and thus air-tight on the remaining portions of the conical wall 40 of the air outlet element 38.

At their tapered ends 52 and 54, respectively, the two elements (air outlet element 38 and slide element 46) can be connected with each other. In this region, the maximally tolerable rotational range of the actuating element 30 for completely opening the air inlet openings 44 and for completely closing the air inlet openings 44 can also be set by providing stop elements 56,58 at the air outlet element 38 and a corresponding stop element 60 at the slide element 46.

To clarify the inner structure of the air outlet device 10 described above with reference to FIG. 2, FIGS. 3 and 4 show further views of the air outlet device 10.

What is claimed is:

1. An air outlet device for an interior of a vehicle, comprising:
    an air outlet element comprising at least one air inlet opening and one air outlet opening;
    a slide element for blocking and unblocking the at least one air inlet opening; and
    an actuating element for moving the slide element, which is arranged at the air outlet opening and comprises a collar,
    wherein the actuating element is supported so as to be rotatable about a longitudinal axis of the collar, and
    wherein the slide element is movable along a curved path for blocking and unblocking when the actuating element is rotated.

2. The air outlet device according to claim 1, wherein the air outlet element is rotationally symmetric and comprises a shell, and wherein the at least one air inlet opening is formed in the shell.

3. The air outlet device according to claim 2, wherein the shell is a cylindrical wall.

4. The air outlet device according to claim 3, wherein the shell is conical.

5. The air outlet device according to claim 1, wherein the air outlet element comprises two diametrically opposed air inlet openings, and wherein the slide element comprises two slide portions respectively allocated to the two air inlet openings.

6. The air outlet device according to claim 5, wherein the slide element and the air outlet element are substantially configured in a uniform manner.

7. The air outlet device according to claim 6, wherein the slide element and the air outlet element each have two diametrically opposed openings extending over substantially 90° in a circumferential direction and/or over substantially the entire axial length of the shell.

8. The air outlet device according to claim 1, wherein the slide element is supported at the air outlet element.

9. The air outlet device according to claim 1, wherein the air outlet element is retained by a retaining element forming a part of an air outlet duct and comprising a spherical outer surface and being pivotably supported in a receiving element.

10. The air outlet device according to claim 1, wherein the air outlet device is arranged above a seat of a vehicle.

11. The air outlet device according to claim 10, wherein the vehicle is an airplane, a bus, or an automobile.

12. The air outlet device according to claim 1, wherein the slide element block and unblocks airflow through the at least one air inlet opening.

13. The air outlet device according to claim 1, wherein the collar is directly attached to the actuating element and is fixedly attached to the slide element.

14. The air outlet device according to claim 1, wherein the slide element is integrally formed with the actuating element.

15. The air outlet device according to claim 1, wherein the collar rotatably engages a lower portion of the air outlet element, the lower portion being in an area of the at least one air outlet opening.

16. The air outlet device according to claim 1, wherein the slide element further comprises a stop that abuts a projection of the air outlet element so that the rotational movement of the slide element is thereby limited by the stop.

17. The air outlet device according to claim 1, wherein the slide element rotates substantially within the air outlet element.

18. The air outlet device according to claim 9, wherein a portion of the retaining element is provided between the collar and the actuating element to thereby retain the air out element.

* * * * *